April 30, 1935. J. S. PECKER 1,999,636
AIRCRAFT WITH ROTATABLE SUSTAINING MEANS
Filed Jan. 30, 1931 7 Sheets-Sheet 5

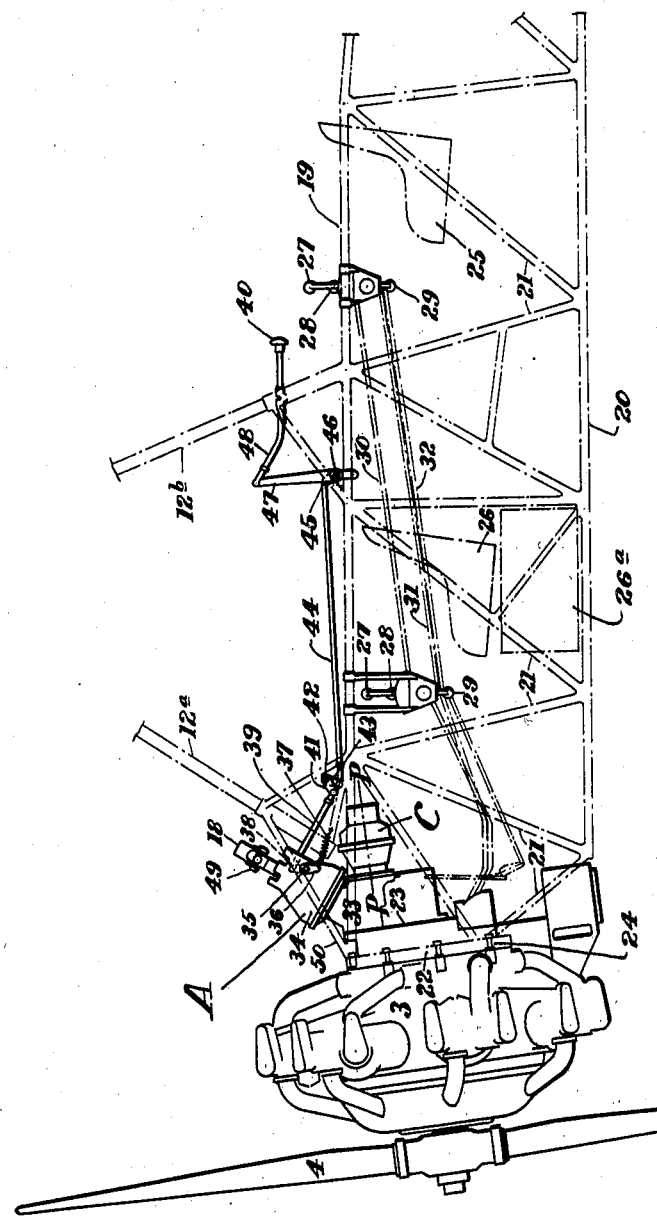

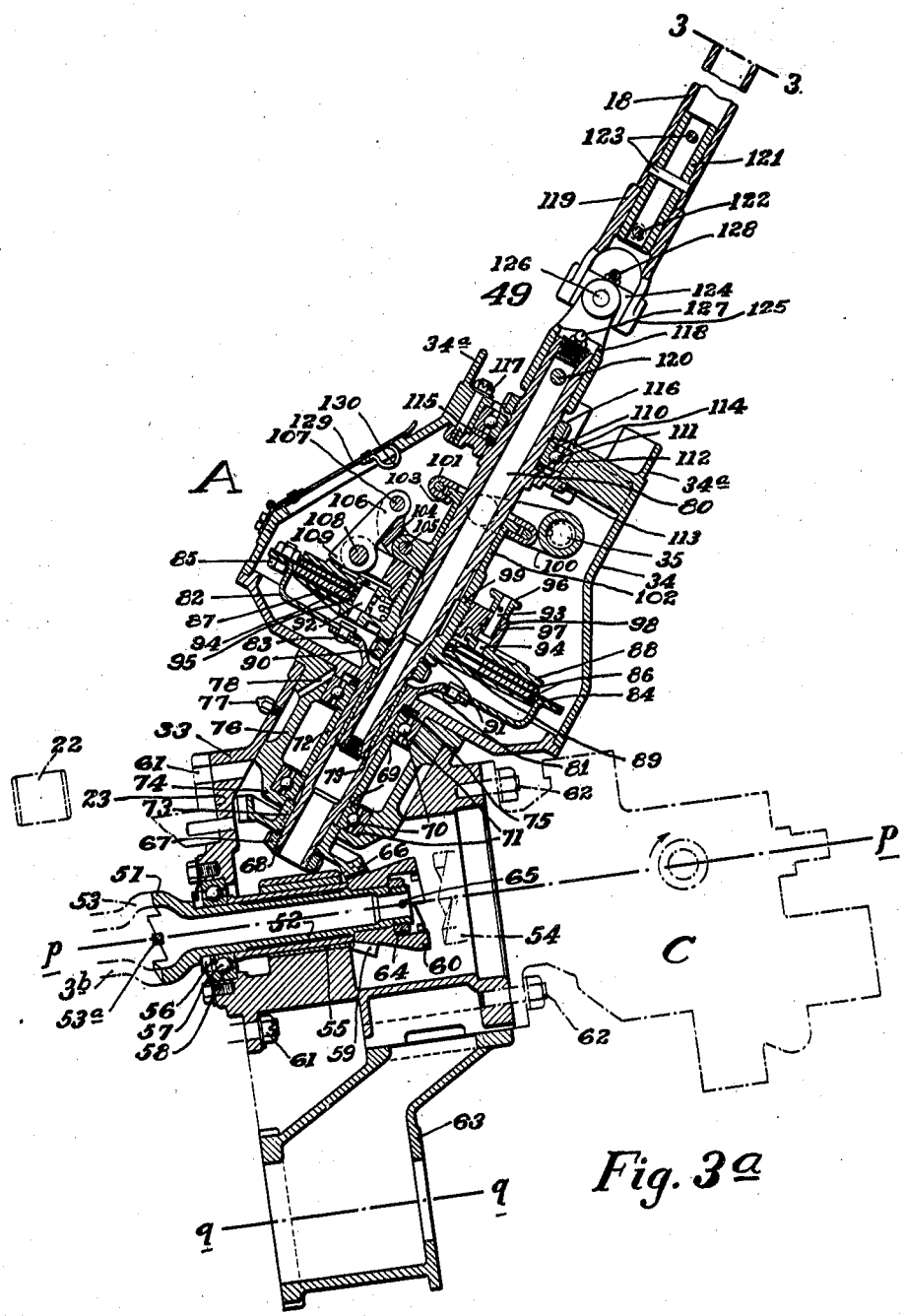
Fig. 3ᵃ

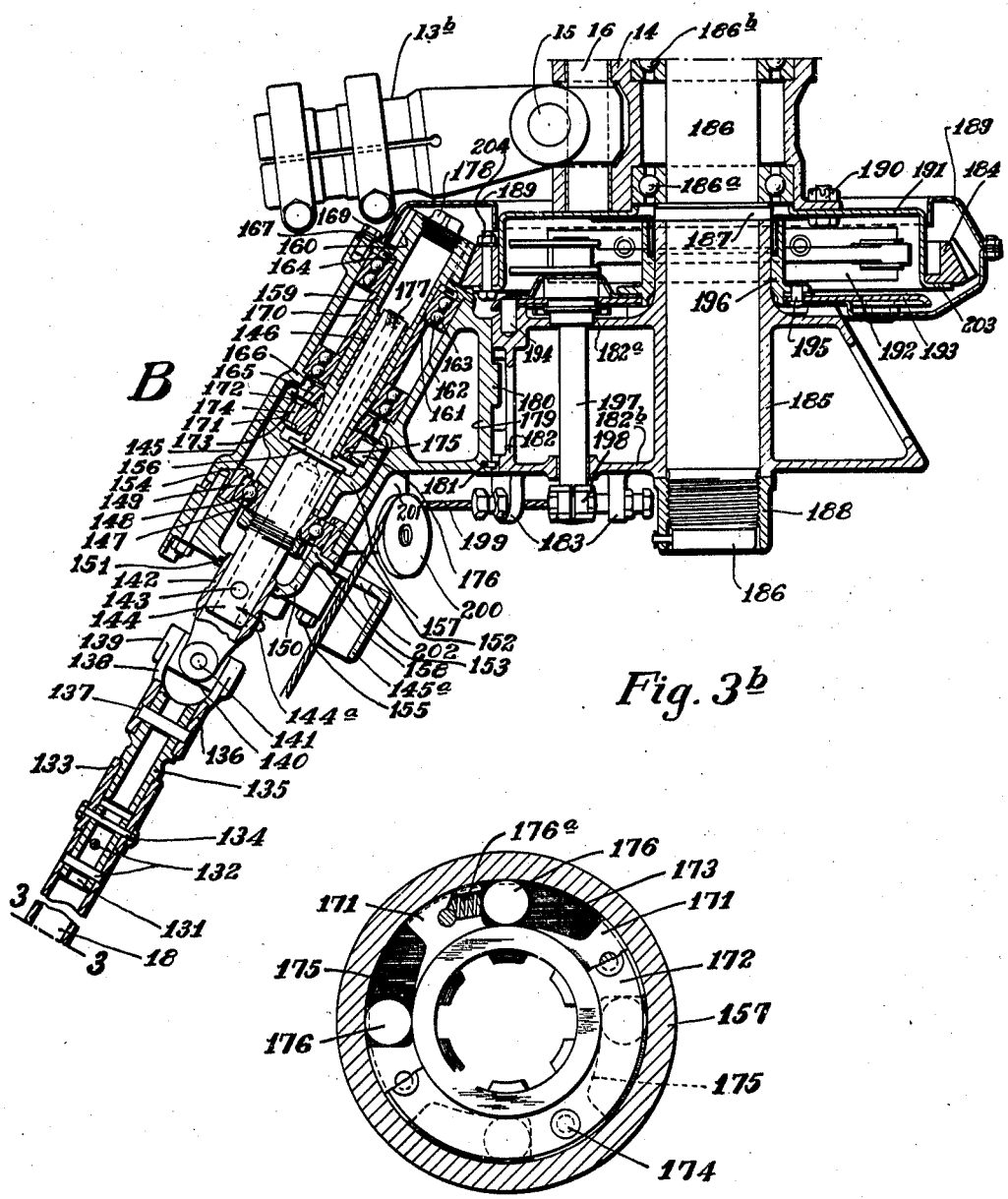

INVENTOR
Joseph S. Pecker
BY
ATTORNEYS

April 30, 1935.    J. S. PECKER    1,999,636
AIRCRAFT WITH ROTATABLE SUSTAINING MEANS
Filed Jan. 30, 1931    7 Sheets-Sheet 6
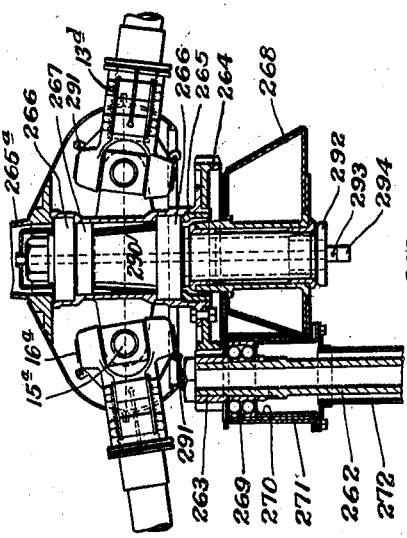
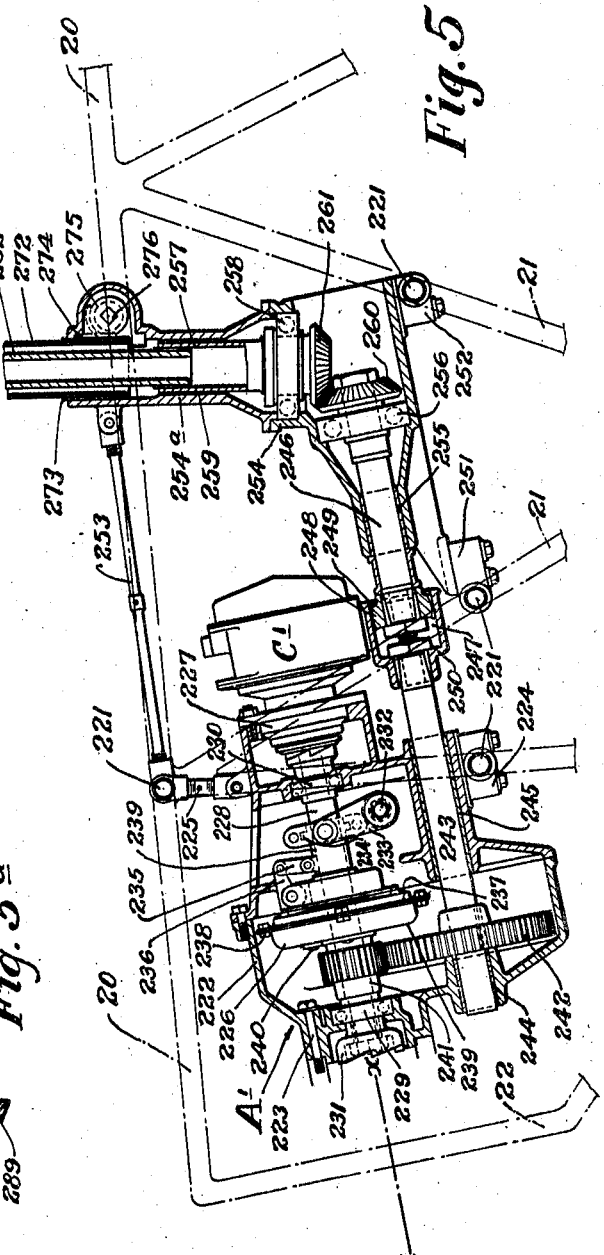
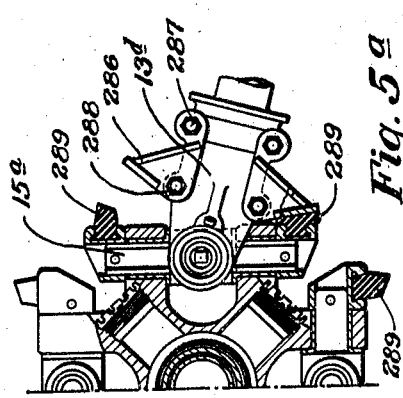
INVENTOR
Joseph S. Pecker
BY
ATTORNEYS Patented Apr. 30, 1935

1,999,636

UNITED STATES PATENT OFFICE 1,999,636

AIRCRAFT WITH ROTATABLE SUSTAINING MEANS

Joseph S. Pecker, Philadelphia, Pa., assignor to Autogiro Company of America, Philadelphia, Pa., a corporation of Delaware Application January 30, 1931, Serial No. 512,383

37 Claims. (Cl. 244—19)

This invention relates to aircraft with rotatable sustaining means, and particularly to the type of craft in which the primary sustension of the machine is effected by a sustaining rotor having blades adapted to be normally rotated and oscillatably displaced by relative air flow in flight, which type is illustrated, in its pristine form, in patent to J. de la Cierva, No. 1,590,497, issued June 29th, 1926.

More particularly, the invention contemplates certain improvements in devices for applying a rotative torque to the sustaining system of such aircraft, and especially improvements over the constructions illustrated, described and claimed in the U. S. patents to J. de la Cierva, numbered 1,673,232 of June 12, 1928 and 1,692,082 of November 20, 1928. The invention is also well adapted to supplement, or be substituted for, slipstream starting devices, such, for example, as found in the pending application of J. de la Cierva, Serial No. 352,554, filed April 4th, 1929 (which issued as Patent No. 1,857,807), and assigned to the assignee of the present application; the present invention being particularly useful in large aircraft, of the type hereinbefore referred to.

One of the primary objects of the invention is to ensure that there be no interference with the free rotation and other actuation of the rotative sustaining blades by relative air-flow, at times when such blades are normally to be driven by such flow.

Another important object of the invention is to simplify and improve the transmission of power from the prime mover or engine of the aircraft, or other source of power, to the rotor or sustaining means, and to improve the manner of taking-off the power from the former.

Still another object of the invention is to provide, in a driving or starting mechanism for rotors of the type described, means to permit the normal amount of "weaving" or movement between the rotor hub, supporting structure or pylon, and fuselage, without damage to any of such parts or to the driving or starting mechanism.

Other objects and advantages of the invention involve: the provision of a very light and yet rugged construction for transmitting rotative torque to the sustaining rotor; the provision of simple and effective mounting means for the transmission mechanism; ready demountability of the same, or parts thereof, as a unit with the engine, from the fuselage; as well as ready application to and removal from the engine and other parts of the construction; the provision of means which will transmit a given amount of power to the rotor, and yet ensure that there shall be no overload, or overtransmission of power; the provision of novel and advantageous clutching and declutching arrangements, and especially of the automatic cut-out means to permit free rotation or over-running of the rotor under the influence of the air; the location of an unclutching or over-running device as near as possible, in the driving connections, to the rotor itself, so that a minimum number of parts are in operation, or connected with the rotor, when the latter is being air-driven; and the arrangement of the mechanism in such manner that if a part breaks or if the mechanism or any part thereof does not function properly no detrimental effects upon the rotor or upon the normal action of the latter will occur.

More specific objects include the provision of a torque-transmitting mechanism, for the above-indicated purposes, which co-operates advantageously with the rotor, its brake mechanism, and other parts, and with the fuselage, engine, pylon, and usual engine starter; which permits the desired mounting of the engine starter close to the engine, while permitting the take-off of power for the rotor from or adjacent the shaft or other device through which the starter normally acts upon the engine; which admits of various arrangements of one or more rotor-drive clutching devices, as, for example, in a drive-shaft between two sets of bevel gears, or between the engine and the engine starter, or between the main engin shaft or an extension thereof and the driving gearing, or in the rear of the driving gearing or part thereof, and the employment of concentric shafts or other devices to keep down the overall size or the overhang of the driving mechanism and/or of the engine starter.

Other objects of the invention involve provisions for: keeping cockpit space as clear as possible; making the driving-mechanism controls or operating levers or other elements simple in form and easy to operate; speeding-up the starting of the rotor, where the device is used for that purpose; reducing wind-resistance, and particularly by mounting parts of the mechanism respectively adjacent or shielded by the fuselage, pylon, and hub structures, or fairings or streamlinings thereof; utilizing either vertically or obliquely disposed driving shafts, and in such manner that either form co-operates to advantage with other parts of the craft; disengaging driving gears themselves, if desired; avoiding fouling of or encroachment upon space normally best used for gasoline tanks or other parts, and generally arranging the parts so that normal disposable loads may be conveniently and advantageously arranged with respect to the center of gravity of the machine; relieving stresses on the fuselage, pylon, motor frame or mounting, and other parts; and conveniently interconnecting the normally substantially horizontally-disposed engine shaft or shafting with the normally substantially vertically disposed rotor axis or hub.

The invention further contemplates provision for dividing the power-transmitting mechanism into a plurality of compact, readily-inspected, and easily housed and streamlined units; preferably a pair of such units, one being mounted adjacent the source of power and the other adjacent the rotor hub, with disconnectible shafting (disconnectible as by a slip-joint or joints) between the units; and further, the inclusion in at least one of said units of means whereby different parts may alternatively be employed, as, for example, different forms of clutches or over-running devices.

Other objects and advantages and various detailed features of the invention will appear as the description of the invention proceeds. In the accompanying drawings:

Figure 2 is a fragmentary skeleton view of the aircraft of Fig. 1 to illustrate, in general, the disposition of one form of the present invention with respect to the fuselage framing, cockpits and power-plant of the craft;

Figure 1:
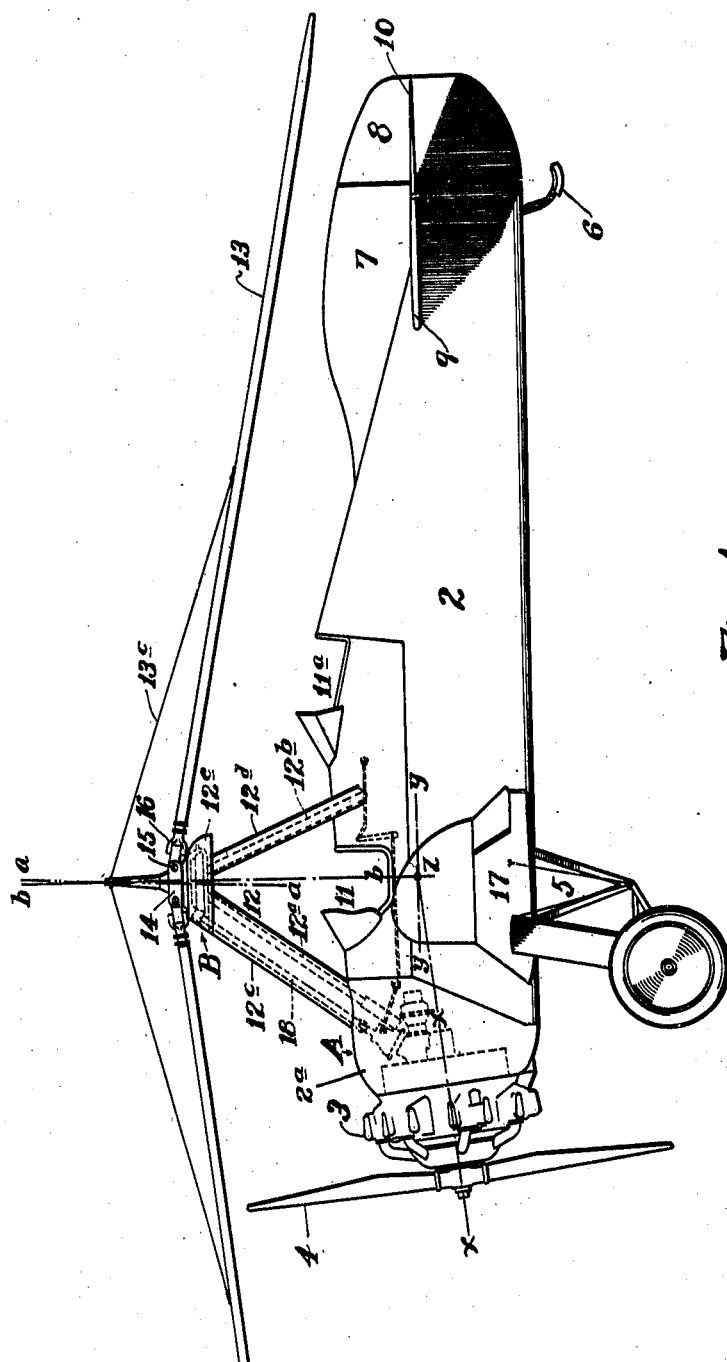
Figure 1 is a side elevational view (more or less diagrammatic as to certain details) of an aircraft with rotatable sustaining means, embodying the present invention in a preferred form.
Figure 4:
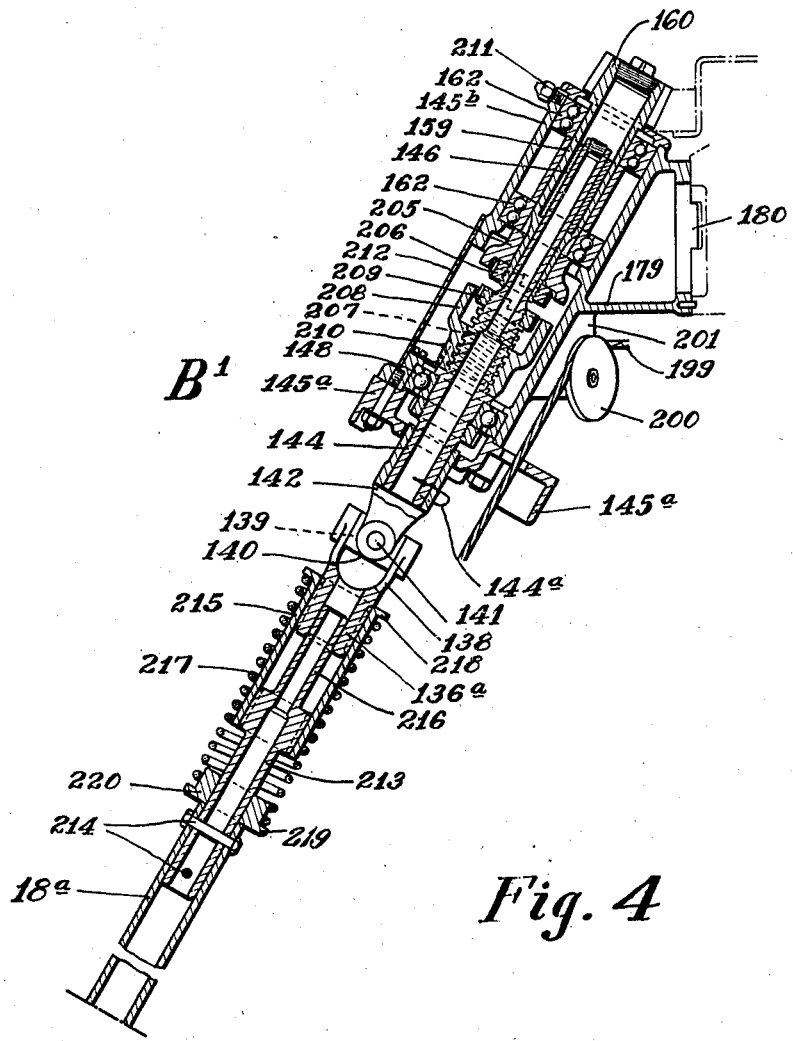
Figure 7:
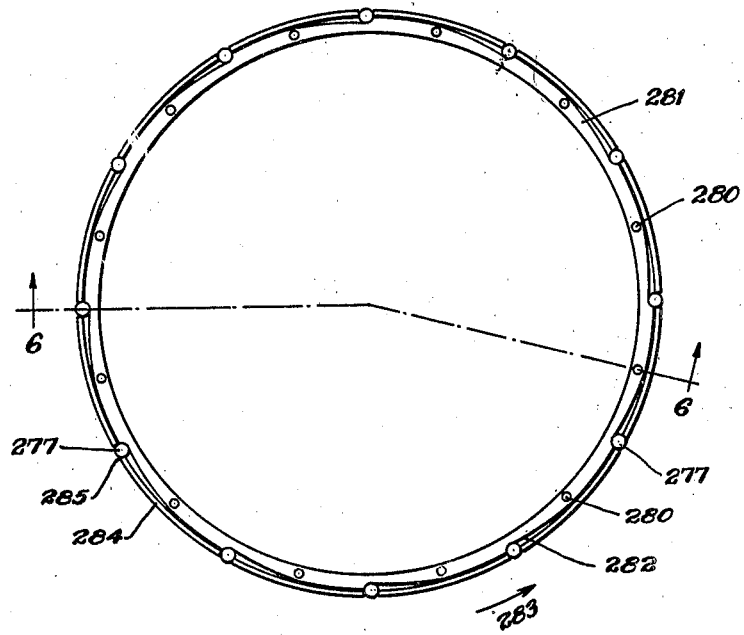
Figure 6:
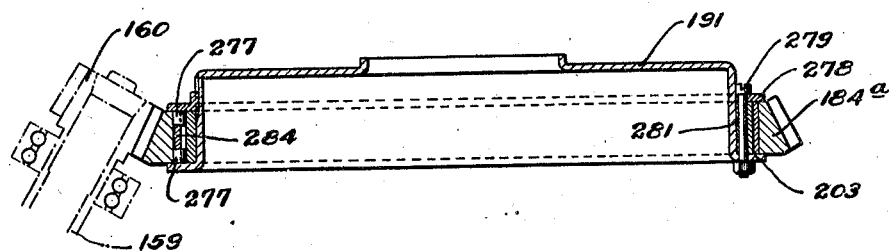

Figures 3a and 3b together form a longitudinal, vertical section of the main features of that form of the present invention which is embodied in Figs. 1 and 2, certain parts being shown in elevation;

Figure 3c is a transverse, enlarged detail through the automatic clutch device of the construction of Figure 3b;

Figure 4 is a fragmentary view similar to Fig. 3b, but illustrating modifications of certain parts of the construction;

Figure 5 is a view similar to the general view of Figs. 3a and 3b, but of a substantially modified general arrangement;

Figure 5a is a half-plan section of the rotor head of Figure 5;

Figure 6 is an enlarged, fragmentary, irregular diametrical section of an over-running clutch or free-wheel device applicable to the constructions of Figures 3b, 4, or 5, in supplementation of, or preferably in substitution for, the automatic clutches of said constructions; the figure showing the application of this clutch adjacent the driven gear and brake-drum of the rotor itself; and Figure 7 is a plan view of the clutch elements of Fig. 6.

By reference first to Fig. 1, it will be seen that I have illustrated an aircraft of the type hereinbefore discussed, in which the sustaining means are normally air-rotated, subject, however, to the application of power or torque, for starting, or other purposes. In general, the machine includes a fuselage or body 2 having an engine or prime mover 3, propeller 4 driven thereby, alighting mechanism or landing gear 5 and skid 6, with fixed and controllable vertical fins or rudders 7, 8, and similar horizontal fins or elevators 9, 10. Cockpits 11 and 11a are provided; there being, over the forward cockpit 11, a supporting pylon or pyramid 12, carrying the normally-air-rotated sustaining means or blades 13 which are mounted on a rotatably-arranged hub or axis member 14, preferably by means of horizontal and vertical pivot pins 15, and 16, respectively; although it will be understood that the blade means may be otherwise displaceably-arranged, either by inherent flexibility, or by other means of mounting, so that they may assume various positions, during their rotation, to eliminate, or to compensate in large measure for, variations in lift, in inertia forces, in bending stresses, in gyroscopic force, or thrust and drag, or for combinations of any two or more, or all, of such forces and/or strains. The craft is further provided with small fixed wings 17, in accordance with present practice.

The various ways of providing for compensation for the forces on the rotor are not, per se, part of my invention, several forms being described and claimed by Juan de la Cierva: in Patent No. 1,590,497 of June 29, 1926; in Patent No. 1,682,893 of September 4, 1928, is applications 145,654 and 145,655, filed November 1, 1926 (which issued respectively as patents numbered 1,811,303 and 1,859,584); in divisional applications of the latter application; and elsewhere. The blade means 13, as seen in Fig. 1, may also be arranged with their axis of rotation $a$—$a$ slightly upwardly and rearwardly inclined with respect to a vertical, $b$—$b$, which is perpendicular to the longitudinal axis, $y$—$y$, of the machine (in accordance with the showing of Patent No. 1,590,497) so that their general path of rotation presents a positive incidence with the ship on an even keel; and the axis $x$—$x$ of the propeller may also be inclined so as to pass near or through the center of gravity $z$, and for other reasons, in accordance with the description and claims of Cierva application Serial No. 432,733, filed March 3rd, 1930 (which issued as Patent No. 1,948,514). Still further, the auto-rotated blades 13 themselves may be individually set, when in radial mid-position on the hub 14, at a slight positive incidence as compared with a no-lift setting with relation to a plane perpendicular to their axis of rotation, for purposes of efficiency and control, as set forth in Cierva application 500,064, filed December 4th, 1930 (which issued as Patent No. 1,948,514).

However, whatever may be the general arrangements of rotor, power-plant, blades, etc., my apparatus particularly contemplates very advantageous arrangements for transmitting torque from the engine, or any other suitable power-plant, to the rotor, for starting the latter; and additionally for the following purposes, to wit: that by my power-transmitter an increased effectiveness of the rotary disc (so to speak) of the blades, in their general action as a rotating plane, might be obtained, so as to increase their reaction against the relative air-flow produced by the forward translational movement of the craft induced by the propeller 4. The compact and effective co-operation of my mechanism with the aircraft just described will be evident from the following:

As indicated somewhat diagrammatically in Fig. 1, the front pylon post or leg 12a and the two rear posts 12b (of which only one is shown) are positioned, respectively, in streamline sheathings 12c and 12d. In the front leg fairing 12c, just forward of the usual leg 12a, I position the diagonal or obliquely-extending shaft 18 of the power-transmission mechanism. This shaft interconnects two units A and B, later to be described; the lower unit A being connected or connectible with engine 3 and housed within the fuselage or body covering 2a, and the upper unit B being connected or connectible with the rotor or its hub 14 and preferably housed within the streamline fairing 12e.

Turning now to Fig. 2, in which the fuselage covering, pylon fairing, rotor, landing gear, and other parts have been omitted, it will be seen that the fuselage with its upper and lower longerons 19 and 20, and side-braces 21 (transverse members being not shown in this view) carries at the forward end an engine mount 22, which may be in the form of a ring through which the rear end or face of the engine extends, as at 23; the engine itself being secured as by bolts 24. In accordance with usual practice, the pilot's seat 25 is placed in the rear cockpit, and the passenger's seat or seats 26 in the front cockpit. Additional space is required by other loads such as gasoline and oil, and baggage, (see, for instance, container 26a beneath the seat 26). Also if dual control is to be provided, the usual engine controls 27, 28, 29 and control rods 30, 31, 32 must be fitted into the available space. In addition, an engine starter C is usually provided, especially with a power-plant of large horsepower.

The foregoing general arrangements, it will be appreciated, leave comparatively little space and weight available for power transmission to the rotor. It is further desirable that the engine 3, and its starter C (if such be employed), be readily removable from the mounting ring 22, and that the starter C be mounted on the rear face of the engine with as little overhang as possible. To all of these requirements my construction is well adapted. In a preferred construction illustrated in Figs. 2, 3a, 3b, 3c, I move the starter C slightly rearwardly from the rear face of the engine, and mount a power take-off device, the casing of which is indicated at 33, between the rear face 23 of the engine and the front face of the engine-starter C, the axial line p—p of the shafts of these devices being in line with the usual stub-shaft 3b (shown in Fig. 3a) of the engine 3, with which the starter C would ordinarily engage.

Bolted, or otherwise secured, to casing 33, and at an upwardly and rearwardly inclined angle, is casing 34 (as seen in Fig. 2) which houses a manually-operable clutch device, actuable by through-shaft 35, one lever 36 of which has a spring 37 tending to hold the clutch in disengaged position. Another lever or arm 38 on said shaft is secured to a pull-rod 39, for engaging the clutch, actuable from either or both cockpits, connections to the control knob 40 in the rear cockpit being indicated at 41, 42, 43, 44, 45, 46, 47 and 48, it being understood that the shafts 42 and 46 are mounted in supports or bearings on fixed parts of the fuselage. Coming out through the fuselage covering is the shaft 18, coupled, at its lower end, to mechanism A by flexible means such as the universal joint 49. From Fig. 2 it will be clear that one of the diagonal braces 50 of pylon post 12a may be mounted at each side of unit A, which makes for compact arrangement and advantageous utilization of space.

Turning now to Fig. 3, the lower half of which is designated as 3a on one sheet of the drawings and the upper half of which is designated as 3b on another sheet (the two parts fitting together on the line 3—3), the internal construction, and the drive to the hub, will appear in detail. Considering first the lower unit A, (as seen in detail in Figure 3a) it will be evident that this comprises generally the power take-off from the engine and the manually-operable clutch, hereinbefore referred to. Toothed end 51 of shaft 52 is in constant mesh with toothed end 53 of shaft 3b of the engine, (keys 53a being preferably provided) which latter shaft is the auxiliary shaft of the engine, ordinarily offset from the crankshaft and with which the toothed end 54 of the engine-starter shaft is usually automatically engaged and disengaged. Shaft 52, which is mounted in a bearing sleeve 55 and a ball-bearing structure 56, 57, 58 carries at its rear end preferably a combined bevel-pinion 59 and tooth-clutch member 60, the element 60 co-operating with clutch element 54 in the same way in which the latter would normally co-act with element 53.

The left-hand end of shaft 52, and its associated parts, fits right into the usual aperture in the back of the engine casing, into which is normally fitted the engine-starter C of any desired type, suitable securing studs or bolts 61 being provided; so that no change in the engine, other than the introduction of keys 53a, need be made. Similarly starter C need not be altered, but is simply moved back far enough to insert the casing 33, on the back of which casing it may be secured by studs or bolts 62. The usual generator, which is ordinarily mounted in parallel alinement (axis q—q) with the starter shaft, may be secured in or on the frame 63, which is here shown as a supplementary supporting bracket for the casing 33. Alternatively, a generator or starter, or both, might be mounted to connect with auxiliary shaft 3b of the engine, and unit A of the rotor starter might be connected to the engine-auxiliary-shaft which ordinarily drives the generator. The advantages of connecting the rotor starter to auxiliary shafting of the engine include not only simplicity and compactness of mounting and elimination of the necessity of altering the engine itself, but also utilization of the reduction of speed of the auxiliary engine-shaft, or shafts to obtain an initial reduction for the starter, and other results which will be apparent as the description proceeds.

Returning to bevel pinion 59, this may be keyed or splined on tubular shaft 52 and secured by nut and cotter 64, 65. Bevel gear 66, secured by nut 67 on the lower end of inclined shaft member 68, is in constant mesh with pinion 59; the said shaft member being carried in ball-bearing structures 69, 70, 71, which latter are spaced by sleeve 72, flanges 73, 74 and ring 75, and the bearings further being housed in the cup-like member 76, which serves to retain lubricant fed by plug 77 and passage 78. Extending within hollow shaft 68, and journalled therein by bearing sleeve 79, is the lower end of shaft member 80.

Within shell 34, shaft 68 carries a flange 81, with a dished plate 82 mounted thereon, as by rivets 83, which latter in turn carries clutch plate or ring 84, as by bolts 85, the said single plate 84 (which is the driving plate) being faced on both sides with clutch lining 86. The lower and upper, driven plates 87, 88, normally separated by spring 89, are carried on shaft 80, as follows: Nut 90 retains plate 87 on the splined portion 91 of shaft 80, so that it is fixed on said shaft. Alternately arranged studs 92 and spring-pressed bolts 93, spaced around the shaft, extend into apertures 94 of plate 88. The studs 92 insure uniform rotational movement of the two plates 87, 88 while permitting the necessary variation in the separation of the two, springs 95 being provided to insure relative sliding of the plate 88 longitudinally of the studs 92. The plugs 93, which have knobs 96 and springs 97, normally hold the actuating-rocker mounting-ring 98 as against rotation on the screw-threaded extension 99 of plate 87, so that said mounting ring normally moves with plates 87 and 88 when they are driven. By lifting the plugs 93, however, against the pressure of springs 97, the ring 98 is free to be turned on the threaded sleeve 99 so as to adjust the clutch for wear, or clearance, as well as for assembling and disassembling the parts.

Engagement of the clutch is effected by turning shaft 35 (clockwise in Fig. 3a) through the connections 38, 39, 40, etc. shown in Figure 2. This causes fork-arms 100 to move collar 101 upwardly, carrying the floating sleeve 102 with it, by means of flange 103. Double-forked lever 104, pivoted to sleeve 102 at 105 and to actuating rocker 106 at 107, thereby forces rocker 106 outwardly, the lower end of said rocker being pivoted on mounting-ring 98 at 108 and having a foot 109 bearing against plate 88. The compression of plates 87, 88 against clutch facings 86, 86 thus drives the shaft member 80, which latter is connected to drive-shaft 18 as follows:

The upper end of tubular shaft element 80 is journalled in a bearing device, 110, 111, 112; suitable bearing-race retaining flanges 113, 114, and shoulder and nut 115, 116, being provided, as well as securing bolts 117. The universal joint, indicated in general at 49, is connected to shaft 80 as by a forked member 118, and to shaft 18 as by a forked member 119; the former being secured to shaft 80 as by a bolt 120, and the latter to shaft 18 as by a splined sleeve and bolt 121, 122, and rivets 123; the universal itself including a joint member 124 and pivots 125, 126. Lubricator fittings 127, 128 may also be provided.

For access to the clutch mechanism, I preferably provide housing 34 with a hinged cover 129, normally kept shut, as by a small spring 130.

While unit A, with starter C, is firmly mounted on the back of and close to engine 3, it will now be clear that flexibility between it and unit B is fully provided for. It will also be clear that the manual clutch is compactly arranged and disengages when control knob 40 (Figure 2) is released, the internal springs 89 and 95, and external spring 37, preventing any "drag" of the clutch plates. This insures minimum danger of interference with free normal air-actuation of the rotor in flight in case of failure or jamming of the over-running clutch later to be described. The location of the manual clutch close to the power-take-off further provides that a minimum number of parts are driven by the engine, in flight, when the hand-clutch is disengaged.

It is to be here noted that the size, frictional characteristics and spring pressure on the clutch can be arranged to transmit, with given gear ratios, a given horsepower which is prevented from being exceeded, and thus damaging any of the structure, by slippage of the clutch at any higher horsepower transmission.

It is further clear that great simplicity and quick operation of the transmission mechanism is possible because of the fact that there need be but one manual control.

Other advantages will appear after a detailed consideration of unit B hereinafter described. In considering said unit it will be understood that it is in general associated with the rotor hub or axis member, or with the rotor "head", which I here use in the sense of the axis member, spindle and apex box, considered as a general unit at the top of the pylon. The hub itself further involves certain features of advantage hereinafter to be referred to.

In the shaft 18, preferably toward the upper end (as seen in Fig. 3b) is a slip-joint which may be formed by securing a splined section 131 into tubular shaft 18 as by rivets 132, an internally-splined sleeve 133 being secured by a removable bolt 134, on the upper end of part 131, and slidably receiving the splined lower end of extension 135 which latter has a head 136 secured as by rivet 137 and carrying ears 138 bored to receive pivot 139 of flexible joint member 140. Said member has another pivot 141 which is mounted in head 142 secured as by rivet 143 to shaft member 144, which extends into housing 145 of unit B.

Shaft 144 forms part of an over-running clutch device and is mounted for rotation, by means of bearing sleeve 146 and bearing races and balls 147, 148, 149; a suitable end closure 150 and lubricant retainer 151 being provided adjacent the bottom of housing 145. Outer bearing race mounting 152, and spacing shoulders 153, 154, are all secured in place, with cover 150, by means of bolts 155. Similarly, the inner race is spaced by shaft flange 156, driving shell 157 and retaining nut 158.

The tubular shaft 159, which internally houses bearing sleeve 146 and externally carries bevel driving pinion 160 is mounted for free rotation in duplicate bearing devices, made up of sets 161, 162, 163. Suitable retaining and spacing members 164, 165, 166, 167, 169 and 170 are also provided.

Splined on the lower end of tubular shaft 159 is a clutch roller retainer formed of parts 171, 172 and 173 secured together as by rivets 174; the element 171 having externally sloping faces, one of which is indicated at 175, between which faces and the inner wall of driving shell 157 the clutch rollers 176 are adapted to co-act. The direction of slope of the faces 175 (as most clearly seen in detail view 3c, which also shows clutch roller springs 176a) is such that the roller clutch engages and drives tubular shaft 159 when shaft member 144 is turned in the direction of the arrow 144a. Tubular shaft 159, however, obviously may freely over-run the shaft 144, which it does under circumstances hereinafter to be referred to. Suitable lubricant retaining and filling plugs 177 and 178 may also be provided, as shown.

As will be evident from Fig. 3b, the housing 145 of unit B is securely mounted, as by the frame or flange 179, keys 180 and pins, bolts or the like 181, on the forward side of the pylon apex box 182, to which there is also secured in any suitable manner (as by heavy ears and bolt devices, 183) the upper terminus of front pylon leg 12a (Fig. 1). Before considering the drive from bevel pinion 160 to bevel ring gear 184 and other parts, a brief description of the rotor head will here be inserted.

In the apex box 182 (which, as generally shown in Fig. 1, is mounted on the craft by a forward leg 12a and by a pair of rear legs 12b) is formed a sleeve 185 to receive a tubular shaft or spindle 186, the latter having a flange or rib 187 to transmit the weight of the rotor to the box and a nut 188 to transmit the lift of the rotor to said box. On the upper extension of spindle 186 is mounted, as by bearing devices indicated generally at 186a, 186b, the hub member 14 carrying a plurality of blade-mounting bearings or pivot devices (one of which is shown) which devices comprise generally horizontal and vertical pivots 15 and 16, which serve to swingingly mount, or support, the sockets 13b of blades 13, on the rotative hub 14. Excessive downward droop of the blades when at rest is prevented by any suitable means such as the droop cables 13c shown in Fig. 1. These not only prevent fouling of the blades 13 on the propeller 4, but also assure proper clearance between sockets 13b and the gear housing 189. The streamline hood 12e (of Fig. 1)) it will be understood, further surrounds, protects and streamlines substantially the entire head construction of Fig. 3b.

As seen in Fig. 3b, the lower end of hub member 14 has secured thereto, as by bolts 190, a brake-drum 191 housing an internal expanding rotor brake, indicated generally at 192. The open bottom of the drum is substantially closed by the member 193, secured, as by pins 194, to upper face 182a of the apex box, and by rivets and collars 195, 196 to the fixed socket 185. The actuation of the brake may conveniently be accomplished by shaft 197 (journalled in upper and lower plates 182a and 182b of the box), lever 198, and cable 199, which latter runs over pulley 200, mounted on flange 201, and extends down through guide-aperture 202, and thence inside the streamline shell 12c (of Fig. 1) into the cockpit or cockpits. This apex box, hub and brake mechanism are not herein claimed per se, as they form the subject matter of other applications, such as those of Joseph S. Pecker, Serial No. 545,451, filed June 19th, 1931, Agnew E. Larsen, Serial No. 529,576, filed April 13th, 1931, and Joseph S. Pecker, Serial No. 561,344, filed September 5th, 1931. Various of these parts, however, are considered and described herein since they involve certain novel cooperative relationships with parts of the present invention.

Returning now to the driving pinion 160, and its relation to other parts, it will be seen that it is constantly in mesh with bevel ring-gear 184, which latter is mounted on the outside of brake drum 191, being supported by the external lip or flange 203 thereof, and securely fastened thereto, as by bolts 204. The rotor, which normally rotates under the action of air-flow in flight at approximately 110 to 150 R. P. M., (dependent upon the particular design) is thus driven, thru reduction gearing, from the engine which, for example, may operate, when at full throttle, around 1600 R. P. M., or over; the shaft 18 operating at about 800 R. P. M. and the stub (starter) shaft 3b of the motor around 1400 R. P. M.

The above ratios, given simply by way of example, obtained by reduction mechanism adjacent the lower part of the drive (reduction between crank-shaft and engine auxiliary shafting and by means of the first set of bevel gearing), and by reduction mechanism adjacent the upper part of the drive (by means of the second set of gearing), may be modified to suit different engines, different rotors, and different operating conditions; but it will be evident that by properly proportioning the gearing any desired speed of rotation may be imparted to the rotor—up to or even higher than full flight speeds. The construction in any instance, however, is preferably such that the necessary power may be transmitted to the rotor through a drive-shaft revolving at sufficiently higher speed than the rotor to admit of a light-weight shaft, but at not such a high speed as to produce excessive vibration or dangerous operating conditions.

The arrangement of the automatic, or over-running, clutch adjacent the final point of power transmission, that is: near the rotor head, reduces to a minimum the danger of stopping or slowing down the rotor when in flight, due to any failure or jamming of other parts of the mechanism; and the provision of an external gear arrangement on the hub, besides the advantage of compact co-operation with the braking and other mechanism and the advantage of powerful transmission with light-weight mechanism, has the further advantage that possible broken gear teeth or foreign elements will be thrown outwardly and not jam the rotor.

The advantages of the general arrangement, having unit A mounted on or adjacent the engine with power take-off between engine and engine-starter, and unit B on or adjacent the rotor, and with a shaft having upper and lower universals and an intermediate slip-joint, interposed between the units and mounted adjacent and approximately in front of the front pylon leg, will now be apparent, from the standpoint of: accessibility, light weight, simplicity, low air-resistance, good vision, flexibility for the movements of pylon, rotor and blades, minimization of encroachment upon passenger and baggage space, short-distance transmission of the power, convenience and sturdiness of mounting of the parts, and so on.

Another advantage which will now become apparent is that of ready interchangeability of parts. This will appear more clearly by an inspection of Figure 4 which is a detail of a modified unit B, here marked B', with a modified drive shaft connected thereto. In this construction a similar mounting device 179, with keys 180, is employed to mount the casing 145b onto the pylon apex box. Pinion 160 is formed or mounted on tubular shaft 159, as in the previous construction. Bearing arrangements are also somewhat similar, and will not be treated here in detail, but the automatic connection and disconnection of shaft 144 with shaft 159 is by means of a toothed clutch instead of the roller clutch arrangement of Figure 3b.

On the lower end of tubular shaft 159 (in the construction of Figure 4) is immovably fixed a tooth-faced collar or dog 205, a retaining nut 206 being also provided. A coarse thread or threads 207 of steep pitch, is or are provided on shaft 144. In threaded engagement therewith is a traveler or toothed nut device 208 which can travel into and out of engagement with dog 205, its upper limit of travel being fixed by nut 209. Upon rotation of shaft 144 in the direction of arrow 144a, the traveler 208 (which is preferably lightly held as against rotation, as by a small spring 210, or by a weight or spring-pressed ball) moves up and engages dog 205 and drives the rotor through pinion 160. Over-running of the rotor is thus also provided with this arrangement, and the positioning of this clutch at an angle approaching the vertical tends to assure the dropping of the traveler to its extreme lower position when power is cut-off from the driving shaft, and when the rotor over-runs the drive.

In the above construction it will be noted that I have provided a pressure lubricator device 211, and an inspection cover 212, which, of course, can as readily be provided in the construction of Figure 3b.

The drive-shaft 18a of this construction has similar flexible-joints, but differs from the previous one in its disconnectible slip-joint, which is formed as follows:

Shaft part 213, secured in shaft 18a, as by removable bolts 214, is splined into sleeve 215, which latter in turn has internal splines engaging with head 136a. This head internally serves as a support for shaft extension 216. A spring 217, acting between flange 218 of sleeve 215 and flange 219 of collar 220, retains the joint in driving relation and further takes up any longitudinal play of the parts and prevents vibration. Assembly and disassembly will be evident from inspection of the drawings.

In the modification shown in Figure 5, I show a construction in which the lower part of the transmission mechanism is dropped so as to be in line with the propeller or crank-shaft of the engine, which further has the effect of lowering the center of gravity. A similar engine-mounting ring 22, and fuselage parts 20, 21 are shown, and, in addition, transverse fuselage members 221. Unit A', however, and other parts, are quite differently arranged, for purposes which will hereinafter appear. Casing 222 of unit A' is supported in part on the rear of the engine, as by bolts 223, in part by a mounting 224 on a cross-member 221, and in part by a variable-length link 225 from another cross-bar 221. Engine-starter C' is moved back far enough to permit bodily insertion of clutch 226 between said starter and the engine.

The connection from starter C' to the engine is by way of an automatic clutch (of any suitable type) indicated at 227, shaft 228 mounted in bearings 229, 230, and clutch device 231 which is in constant engagement with the crank-shaft of the engine. To take off power from main shaft 228, cross-shaft 232 is turned (by a suitable series of connections leading to the cockpit, as in the construction shown in Figure 2) which causes arm or arms 233 to pull back the sleeve 234, causing a toggle action on levers 235 and 236 and forcing a pair of revolving clutch-plates together against a clutch ring 237, which latter is secured by bolts 238, dished plate 239 and rivets 240, to floating pinion 241 (the latter being loose on shaft 228). Said pinion drives gear 242 mounted fast on shaft 243, which is rotatable in bearings 244, 245. Shaft 243 is thus driven at a reduced speed as compared with the main shaft 228 (which is substantially an extension of the engine crankshaft), and drives shaft 246 through the intermediation of any suitable flexible coupling 247, so that the latter shaft and the rest of the mechanism which is more closely associated with the rotor, and the structure associated with the engine, may have a certain degree of freedom for relative weaving or other slight movement, such as normally takes place in the fuselage and pylon under operating conditions, or to care for angular inaccuracies in construction.

The joint 247 is also preferably constituted as a disconnectible slip-joint, the parts 248 on shaft 246 being slid in between lugs 249 on cup member 250 which is fast on shaft 243, so that, upon disconnection of supports 224 and 225, the engine, unit A' and starter C' may be pulled out forwardly as a unit.

Supports 251 and 252, and brace 253, which may be made slightly flexible if desired, secure the split housing 254, 255a, to the fuselage. Shaft 246, mounted in bearings 255 and 256, drives the short tubular shaft 257 (mounted in bearings 258, 259) by means of bevel gearing 260, 261. The upper end of shaft 257 has a slidable, splined connection with the lower end of torque tube 262, whereby pinion 263 (fast on the upper end of tubular shaft 262) may be actuated to turn the gear 264 which is fast on hub 265. As before, this hub is rotatively mounted on bearings 266, 267, and the blade sockets 13d are mounted on horizontal and vertical pins 15a, 16a. The apex box 268 and driving mechanism are well adapted for use with a four post pylon, although a three post pylon might readily be used, as by mounting the odd leg at the rear, and the other two legs one on each side of the driving mechanism. Since shafting 262, 272 is placed in the forward part of the space beneath the pylon, and the starter and unit A' are placed forwardly, the passenger seat may be fitted into the forward cockpit in the rear part of the space beneath the pylon.

A feature of the form of mechanism shown in Figure 5 is the ability to disengage the drive immediately at the hub which is accomplished as follows:

Just beneath pinion 263, shaft 262 is journalled in bearings 269 which are carried in a shell 270, slidable in the fixed housing 271, and fixed on the upper end of slidable tube 272. At the lower end, tube 272 slides in a bushing 273 and carries a rack 274 engaged with a pinion 275, which latter, upon being actuated by the turning of shaft 276 by any suitable lever or control device (not shown) causes engagement or disengagement of the gearing 263, 264.

While the construction just outlined may be combined with the brake arrangements and/or with overrunning clutch devices, it is not here so shown, as it is possible with the arrangement as illustrated to utilize the engine as a cushion or brake for the rotor. In starting the rotor, with this construction, shaft 276 is turned to throw pinion 263 into mesh with gear 264, and then the manually-operated clutch on shaft 228 is slowly put into engagement by turning shaft 232 (clockwise, in Figure 5). The engine is then speeded up by the usual throttle control, and when the rotor attains suitable flight speed, or over, the clutch and/or pinion is or are disengaged, and the craft takes off. To stop the rotor, upon alighting, the engine is stopped, gearing 263, 264 is thrown into mesh, and the clutch gradually engaged. The compression of the engine cushions the whole mechanism and brings the rotor to a stop.

A modified roller-clutch over-running or free-wheeling device is illustrated in Figures 6 and 7. This construction may be used in conjunction with one or another of the main arrangements hereinbefore described, but for ordinary purposes I contemplate substitution of this clutch device for that of unit B or of unit B' or for the disengageable pinion device 263 of Figure 5. On the outside of brake drum 191 I rotatably mount a bevel ring-gear 184a, between which and the drum is interposed the roller clutch. Pinion 160 on shaft 159 (as before) meshes with said external ring-gear. The ring gear peripherally retains the rollers 277 of the roller clutch; and the flange 283 and ring 278, with through-bolts 279 retain the clutch and gear as against up-and-down displacement.

The bolts, seen in Figure 6, extend through the ring 278 (which ring is removed in plan view, Figure 7), thence through holes 280 in fixed clutch ring 281, and finally through flange 283. Ring 281 has sloping faces or cams 282 between which and the inner peripheral wall of the gear 184a the rollers 277 may co-act when gear 184a is driven in the direction of arrow 283. Proper interspacing of the rollers peripherally of the device is maintained at all times by the spacer ring 284, which has upper and lower recesses 285 forming small pockets to receive the rollers 277.

The chief advantage of this construction is the fact that without employing slidable gears, the driving mechanism is automatically cut out immediately at the hub and no gears or other parts thereof need be rotated by the air-driven rotor, in normal flight.

All the constructions lend themselves very readily to streamlining, and while I have shown (in Fig. 1) a common streamline sheath 12c around both the shaft 18 and the front leg 12a, I may separately streamline the driving mechanism, and to this end I have provided the shoulders 34a and 145a, respectively, on housings 34 and 145 of units A and B, to support the lower and upper ends of a thin metal or other streamline sheath, if desired.

Similarly, in all the constructions I preferably provide means controlling or limiting the blade displacement movements set up by the power of the driving mechanism acting on the rotor through the hub thereof, such power being considerable and the stresses in service rather severe. To this end, as seen in detail in Figure 5a, I provide the blade sockets 13d with brackets 286, secured by bolts 287 (which normally tightly clamp the split socket onto the threaded end of the blade spar indicated in Figure 5) and also by auxiliary bolts 288; said brackets being adapted to swing with the blade and press against rubber cushions 289 mounted to move with the transverse pins 15a. The particular bearing arrangement of thrust and radial bearings 266, 267, is also advantageous to withstand the rotor-starter drive-forces.

To insure proper lubrication of the said bearings I may employ a lubricant reservoir in the hub cone 265a, and a lubricant retainer 290 as shown; and, for lubrication of the blade pivots, suitable plugs 291, I further provide a single retainer nut 292 for the rotor, and a disconnecting device or joint 293 in the tachometer drive 294, so that the rotor as an entirety may be lifted out (the rotor driving gears, at the hub, readily slipping out of engagement). This rotor hub construction, as shown, is conveniently shielded or streamlined (as in Figure 5) and has other detailed features of advantage which will be evident to those skilled in the art.

What I claim is:—

1. In combination with an aircraft having a normally air-driven sustaining rotor with displaceable blades, a prime-mover for the forward propulsion of the craft, driving mechanism for the rotor operatively associated with said prime-mover, and means controlling displacement movements of the blade-means set up by the driving mechanism.

2. In an aircraft having a normally air-driven displaceable-bladed sustaining rotor, the combination of a power-plant, propelling means for the craft normally actuated by said power plant, a rotor-starter actuable by said power-plant, and a starter for the power-plant operating through a part of the rotor starter.

3. In an aircraft, a rotative sustaining unit having an axis member and blades mounted thereon for rotative and swinging actuation by relative air-flow; and means for imparting a torque to said unit including a prime-mover, a starting device therefor with driving interconnections, extended therefrom to the prime-mover and power-transmitting means between said interconnections and said sustaining unit.

4. In an aircraft, a rotative sustaining unit having an axis member and blades mounted thereon for rotative and swinging actuation by relative air-flow; and means for imparting a torque to said unit including a prime-mover, a starting device therefor with driving interconnections, extended therefrom to the prime-mover and power-transmitting means between said interconnections and said sustaining unit, said power-transmitting means including means permitting said unit to over-run the driving power.

5. In an aircraft, a rotative sustaining unit having an axis member and blades mounted thereon for rotative and swinging actuation by relative air-flow; and means for imparting a torque to said unit including a prime mover, a starting device therefor with driving interconnections, extended therefrom to the prime-mover and power-transmitting means between said interconnections and said sustaining unit, said power-transmitting means including a free-wheel device.

6. In an aircraft, a rotative sustaining unit having an axis member and blades mounted thereon for rotative and swinging actuation by relative air-flow; and means for imparting a torque to said unit including a prime mover, a starting device therefor with driving interconnections, extended therefrom to the prime-mover and power-transmitting means between said interconnections and said sustaining unit, said power-transmitting means including an over-running clutch and other disconnecting means operable at will.

7. In an aircraft, a rotative sustaining unit having an axis member and blades mounted thereon for rotative and swinging actuation by relative air-flow; and means for imparting a torque to said unit including a prime mover, a starting device therefor with driving interconnections extended therefrom to the prime-mover and power-transmitting means between said interconnections and said sustaining unit, said power-transmitting means including an over-running clutch and a manually operable clutch.

8. In an aircraft, a rotative sustaining unit having an axis member and blades mounted thereon for rotative and swinging actuation by relative air-flow; and means for imparting a torque to said unit including a prime-mover, a starting device therefor with driving interconnections extended therefrom to the prime-mover and power-transmitting means between said interconnections and said sustaining unit, said power-transmitting means including an over-running clutch and a manually operable clutch, the latter being constructed and arranged to limit the drive if a given horsepower be exceeded.

9. In an aircraft having a body, an engine and a propeller, a rotative sustaining unit for the craft mounted above the engine for actuation by relative air-flow, shafting between the engine and the rotor unit arranged to transmit torque from the former to the latter, and means providing flexibility in said shafting, including a pair of universal joints and a sliding joint between them.

10. In an aircraft having a body, an engine and a propeller, a rotative sustaining unit for the craft adapted to be actuated by relative air-flow, a shaft adapted to transmit torque from said engine to said rotor unit, and gearing between engine and shaft and between shaft and rotor, together with means for disconnecting the drive closely adjacent the rotor, said last means including a disengageable pair of gears.

11. In an aircraft having a displaceable-bladed sustaining rotor including an axis member mounted so that the rotor is normally air-actuated, a prime-mover, shafting, a set of gears connecting the prime-mover to the shafting, and means connecting the shafting to the rotor, said last means including a second set of gears; and at least two clutch devices, one of said clutch devices being between the second set of gears and the rotor.

12. In an aircraft, a rotative sustaining unit having an axis member and blades mounted thereon for rotative and pivotal actuation by relative air-flow; and means for imparting a torque to said unit including a prime-mover, a starting device therefor with driving interconnections, and power-transmitting means between said interconnections and said sustaining unit, said power-transmitting means including an over-running clutch.

13. In an aircraft of the type referred to, a sustaining rotor, a pylon supporting the same on the body of the craft, fuselage elements, and an engine, divergent bracing elements interconnecting pylon elements and fuselage elements, and rotor starter mechanism saddled between elements.

14. In an aircraft of the type referred to, a sustaining rotor, a pylon supporting the same on the body of the craft, fuselage elements, and an engine, divergent bracing elements interconnecting pylon elements and fuselage elements, and rotor starter mechanism saddled between elements and having a support on the engine.

15. In an aircraft of the type referred to, a sustaining rotor, a pylon supporting the same on the body of the craft, fuselage elements, and an engine, divergent bracing elements interconnecting pylon elements and fuselage elements, and rotor starter mechanism saddled between elements and positioned at least in part within the fuselage fairing.

16. In an aircraft of the type referred to, a sustaining rotor, a pylon supporting the same on the body of the craft, and a rotor starter having parts including a driving pinion, slidably mounted on the pylon structure.

17. In an aircraft of the type referred to, a sustaining rotor, a pylon supporting the same on the body of the craft, and a rotor starter having parts including a driving pinion, slidably mounted on the pylon structure and adapted to connect and disconnect the drive.

18. In an aircraft of the type referred to, a sustaining rotor, a pylon supporting the same on the body of the craft, and a rotor starter having parts including a driving pinion, slidably mounted on the pylon structure and adapted to connect and disconnect the drive, together with control means including a rack and pinion for effecting the sliding movement.

19. In aircraft-rotor-drive mechanism, concentric internal and external shafts, an engine connected to one, a gear on another, means for clutching the shafts together, and means for transmitting power from the gear to said rotor, together with an engine starter connectible to one of said shafts.

20. In aircraft-rotor-drive mechanism, concentric internal and external shafts, an engine connected to one, a gear on another, means for clutching the shafts together, and means for transmitting power from the gear to said rotor, together with an engine starter connectible to the first of said shafts.

21. In sustaining-rotor actuating-apparatus of the character described, a hub for the rotor, a brake-drum on said hub and a driven gear on said drum, with an over-running clutch between said gear and drum.

22. In sustaining-rotor actuating-apparatus of the character described, a generally upwardly-directed drive-shafting for actuating the rotor, and a threaded traveling-dog clutch arranged in said shafting and so positioned that the dog travels up for engagement and down for disengagement.

23. An aircraft including an engine, a sustaining rotor, a driving connection extended between the engine and the rotor, a clutch in said connection constructed to limit the power transmittible, and means for manually disengaging said clutch.

24. In an aircraft, a forward propulsion engine, a sustaining rotor constituting a primary means of sustension for the craft, a mechanism for interconnecting the engine and the rotor to drive the latter from the former, and a braking means for the rotor incorporating at least a portion of said driving mechanism and arranged to impose the drag of the engine on the rotor to lower the rotational speed thereof.

25. In an aircraft having a body, an engine and a propeller, a rotative sustaining unit for the craft adapted to be actuated by relative air-flow, a starter for the engine, a driving device for said sustaining unit, said starter and said driving device being connected or braced to each other for purposes of support on the engine, and means for supporting the starter and driving device on the engine.

26. In an aircraft, an engine a sustaining rotor mounted above the engine, a transmitter of power extended between the engine and the rotor, and reduction mechanism between engine and transmitter, and between transmitter and rotor, the reduction mechanism between the transmitter and the rotor including a relatively small diameter gear connected to the transmitter and a relatively large diameter gear mounted for movement about the axis of the rotor and disposed in a plane closely adjacent to the general plane of the rotor.

27. An aircraft including, as a primary means of sustension, a rotor system comprising a hub structure and sustaining wings or blades pivotally connected to the hub structure on generally upright axes, said system being arranged for normally free rotation under the influence of relative air-flow in flight, a forward propulsion engine for the craft, means for imparting a torque to said rotor including a mechanical driving connection extended from the engine to the rotor, and cooperating stops on the hub structure and the wings for limiting pivotal movements of the latter on their upright axes set up as a result of the application of a driving torque.

28. In combination with an aircraft, a sustaining rotor, a forward propulsion engine, an engine starter, and a rotor starter including shafting connected with the engine, there being a shaft common to the drive of both starters.

29. In an aircraft, a displaceable-bladed sustaining rotor arranged for autorotational air actuation, structural means extended appreciably above the main body structure of the craft, a rotor support mounted adjacent the top of said structural means, a hub for the rotor rotatively mounted on said support, a forward propulsion engine for the craft located below the general plane of the rotor, and a mechanism for transmitting torque from said engine to the rotor hub including driving parts which are grouped in two compact units, a driving connection between said units, one of the units incorporating an overrunning clutch and being mounted on said support adjacent the general plane of the rotor and further including gearing connected with the rotor hub, and the other of said units incorporating a manually operable clutch and gearing connected with the engine, being located in the body of the craft closely adjacent to the engine and mounted to be removable as a unit therewith.

30. In an aircraft, a displaceable-bladed sustaining rotor arranged for autorotational air actuation, structural means extended appreciably above the main body structure of the craft, a rotor support mounted adjacent the top of said structural means, a hub for the rotor rotatively mounted on said support, a forward propulsion engine for the craft located below the general plane of the rotor, and a mechanism for transmitting torque from said engine to the rotor hub including driving parts which are grouped in two compact units, a driving connection between said units, one of the units incorporating an overrunning clutch and being mounted on said support adjacent the general plane of the rotor and further including gearing positioned above the support and connected with the rotor hub, and the other of said units incorporating a manually operable clutch and gearing connected with the engine, being located in the body of the craft closely adjacent to the engine and mounted to be removable as a unit therewith.

31. In an aircraft, a displaceable-bladed sustaining rotor arranged for autorotational air actuation, structural means extended appreciably above the main body structure of the craft, a rotor support mounted adjacent the top of said structural means, a hub for the rotor rotatively mounted on said support, a forward propulsion engine for the craft located below the general plane of the rotor, and a mechanism for transmitting torque from said engine to the rotor hub including driving parts which are grouped in two compact units, a driving connection between said units, one of the units being mounted on said support adjacent the general plane of the rotor and incorporating gearing positioned above said support and connected with the rotor hub, and the other of said units incorporating additional gearing connected with the engine and being located in the body of the craft closely adjacent to the engine and mounted to be removable as a unit therewith, and a clutch in the torque transmitting mechanism, said clutch being operatively disposed between the gearing of said two units but being supported and mounted with one of said units.

32. In an aircraft, a displaceable-bladed sustaining rotor arranged for autorotational air actuation, structural means extended appreciably above the main body structure of the craft, a rotor support mounted adjacent the top of said structural means, a hub for the rotor rotatively mounted on said support, a forward propulsion engine for the craft located below the general plane of the rotor, and a mechanism for transmitting torque from said engine to the rotor hub including a torque shaft driven from the engine, one end of which is journalled and carried on said support above the body of the craft in horizontally offset relation with respect to the axis of the rotor hub, means positioned above said support and serving to transmit torque from the shaft to the rotor hub, parts of the means last mentioned being mounted on said support for relative movement to connect and disconnect the drive, and manually operable means coupled with one of said movable parts for effecting movement thereof.

33. In an aircraft, a displaceable-bladed sustaining rotor arranged for autorotational air actuation including an axis member, a forward propulsion engine for the craft, a mechanism for transmitting torque from said engine to said axis member including a pair of shafts one of which is normally connected with the engine, a gear mounted on the other of said shafts, means for clutching and declutching said shafts, torque transmission means interconnecting said gear and the axis member, and an engine starter adapted to be coupled with the shaft which is normally connected with the engine.

34. In an aircraft, a displaceable-bladed sustaining rotor arranged for autorotational air actuation including an axis member, a forward propulsion engine for the craft, and a mechanism for transmitting torque from said engine to said axis member including concentric internal and external shafts one of which is connected with the engine, means for clutching and declutching said shafts, said means being associated with said shafts at a point spaced from the engine, a gear mounted on the other of said shafts intermediate the clutching means and the engine, torque transmission means interconnecting said gear and the axis member, and an engine starter adapted to be coupled with the shaft which is connected with the engine at a point spaced from the engine beyond the point first mentioned.

35. In an aircraft, a displaceable-bladed sustaining rotor arranged for autorotational air actuation, structural means extended appreciably above the main body structure of the craft, a rotor support mounted adjacent the top of said structural means, a hub for the rotor rotatively mounted on said support, a forward propulsion engine for the craft located below the general plane of the rotor, and a mechanism for transmitting torque from said engine to the rotor hub including driving parts which are grouped in two compact units, a driving connection between said units, one of the units incorporating an overrunning clutch and being mounted on said support adjacent the general plane of the rotor and further including speed reduction mechanism connected with the rotor hub, and the other of said units incorporating a manually operable clutch and speed reduction mechanism connected with the engine, being located in the body of the craft closely adjacent to the engine and mounted to be removable as a unit therewith.

36. In an aircraft having a forward propulsion engine and an autorotatable sustaining rotor having pivotally mounted blades; a compact rotor head unit incorporating a hub member, driving mechanism for transmitting torque from the forward propulsion engine to the rotor hub, the driving mechanism adjacent the hub including torque shafting and an overrunning or free-wheeling device, a rigid support device forming part of the head and on which the other said parts of the rotor head unit are compactly mounted and secured in operating alignment; and supporting means for the said unit including structural means extended appreciably upwardly from the main body structure and secured to said rigid support device in spaced relation above said main body structure.

37. For an aircraft having a body with a compartment therein for variable load, a forward propulsion engine, an autorotatable sustaining rotor incorporating a plurality of elongated wings, and a rotor mount for supporting the rotor center in spaced relation above said compartment and the body of the aircraft proper; a compact rotor head unit including a hub for the rotor having pivotal mountings for the wings, a relatively non-rotatable hub supporting member, bearings between the hub and supporting member, and rotor drive mechanism including a reduction gearing and an overrunning device; the said parts of the rotor head unit being arranged substantially in a common plane and mounted on and supported by said rotor mount at the top thereof in a generally centralized position above said compartment; and a flexible power connection extending up from said propulsion engine to said drive mechanism, and positioned clear of the load space; whereby in spite of the magnitude of the flight and driving loads and the possible vibrations and weaving of the rotor mount relative to the body, all the parts of said rotor head unit are maintained in their proper operative relations and alignment.

JOSEPH S. PECKER.

CERTIFICATE OF CORRECTION.

Patent No. 1,999,636.  April 30, 1935.

JOSEPH S. PECKER.

It is hereby certified that error appears in the printed specification of the above numbered patent requiring correction as follows: Page 2, second column, line 38, for the serial number "432,733" read 432,773; and line 47, for "1,948,514" read 1,947,901; page 6, first column, line 72, for "255a" read 254a; and that the said Letters Patent should be read with these corrections therein that the same may conform to the record of the case in the Patent Office.

Signed and sealed this 25th day of June, A. D. 1935.

Bryan M. Battey
Acting Commissioner of Patents.

(Seal)